United States Patent
Motallebi et al.

(10) Patent No.: US 10,597,304 B2
(45) Date of Patent: *Mar. 24, 2020

(54) SURFACE-MODIFIED CYANIDE-BASED TRANSITION METAL COMPOUNDS

(71) Applicant: Natron Energy, Inc., Santa Clara, CA (US)

(72) Inventors: Shahrokh Motallebi, Los Gatos, CA (US); Colin Deane Wessells, Menlo Park, CA (US)

(73) Assignee: Natron Energy, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/569,249

(22) Filed: Sep. 12, 2019

(65) Prior Publication Data

US 2020/0002182 A1    Jan. 2, 2020

Related U.S. Application Data

(60) Continuation of application No. 15/859,160, filed on Dec. 29, 2017, now Pat. No. 10,414,666, which is a
(Continued)

(51) Int. Cl.
*C01C 3/11*     (2006.01)
*H01M 4/60*    (2006.01)
(Continued)

(52) U.S. Cl.
CPC .............. *C01C 3/11* (2013.01); *C01C 3/12* (2013.01); *C01G 45/006* (2013.01); *H01M 4/58* (2013.01);
(Continued)

(58) Field of Classification Search
CPC ........... C01C 3/11; C01C 3/12; C01G 45/006; H01M 4/60; H01M 4/58
See application file for complete search history.

(56) References Cited

U.S. PATENT DOCUMENTS 9,287,589 B2   3/2016   Wessells et al.
9,299,981 B1   3/2016   Motallebi et al.
(Continued)

OTHER PUBLICATIONS

Hyun-Wook Lee et al: "Maganese hexacyanomanganate open framework as a high-capacity positive electrode material for sodium-ion batteries", Nature Communications, Nature Publishing Group, United Kingdom, vol. 5, Oct. 14, 2014 (Oct. 14, 2014), pp. 5280-1, XP002752587, ISSN: 2041-1723, DOI: 10.1038/NCOMMS6280 [retrieved Oct. 14, 2014].
(Continued)

*Primary Examiner* — Stewart A Fraser
(74) *Attorney, Agent, or Firm* — Patent Law Offices of Michael E. Woods; Michael E. Woods

(57) ABSTRACT

A system, method, and articles of manufacture for a surface-modified transition metal cyanide coordination compound (TMCCC) composition, an improved electrode including the composition, and a manufacturing method for the composition which may include multiple chelation species (Che_x). The composition, compound, device, and uses thereof according to $A_x Mn_{(y-k)} M^j_k [Mn^m(CN)_{(6-p-q)}(NC)_p (Che\_I)^r_q]_z \cdot (Che\_II)^s_{(1-z)} \cdot nH_2O$, wherein CHE_GROUP includes one or more chelation materials selected from the group consisting of $(Che\_I)^r_w$, $(Che\_II)^s_v$, and combinations thereof, and wherein $0 < j \leq 4$, $0 \leq k \leq 0.1$, $0 \leq (p+q) \leq 6$, $0 < x \leq 4$, $0 < y \leq 1$, $0 < z \leq 1$, $0 < w \leq 0.2$; $-3 \leq r \leq 3$; $0 < v \leq 0.2$; $-3 \leq s \leq 3$; and $0 \leq n \leq 6$; wherein $x+2(y-k)+jk+(m+(r+1)q-6)z+wr+vs=0$.

8 Claims, 11 Drawing Sheets

Related U.S. Application Data continuation of application No. PCT/US2016/040209, filed on Jun. 29, 2016, which is a continuation of application No. 14/880,010, filed on Oct. 9, 2015, now Pat. No. 9,359,219, which is a division of application No. 14/755,607, filed on Jun. 30, 2015, now Pat. No. 9,299,981, said application No. PCT/US2016/040209 is a continuation of application No. 14/755,607, filed on Jun. 30, 2015, now Pat. No. 9,299,981.

(51) Int. Cl.
*H01M 4/58* (2010.01)
*C01G 45/00* (2006.01)
*C01C 3/12* (2006.01)
*H01M 10/36* (2010.01)
*H01M 10/05* (2010.01)

(52) U.S. Cl.
CPC .............. *H01M 4/60* (2013.01); *H01M 10/05* (2013.01); *H01M 10/36* (2013.01)

(56) References Cited

U.S. PATENT DOCUMENTS

| | | |
|---|---|---|
| 9,359,219 B1 | 6/2016 | Motallebi et al. |
| 10,414,666 B2* | 9/2019 | Motallebi ................ C01C 3/11 |
| 2014/0127560 A1 | 5/2014 | Wessells et al. |
| 2014/0127592 A1* | 5/2014 | Wessells ................ C25D 17/10 429/347 |
| 2014/0220392 A1 | 8/2014 | Wessells et al. |
| 2014/0308544 A1 | 10/2014 | Wessells et al. |

OTHER PUBLICATIONS

Mauro Pasta et al: "Full open-framework batteries for stationary energy storage", Nature Communications, vol. 5, Jan. 6, 2014 (Jan. 6, 2014) pp. 3007-1, XP055150480, United Kingdom ISSN: 2041-1723, DOI: 10.1038/ncomms4007.

International Search Report for International application No. PCT/US2016/040209 with transmission date Oct. 31, 2016.

Written Opinion of the International Searching Authority for International application No. PCT/US2016/040209 transmitted Oct. 31, 2016.

Mauro Pasta et al: "Full open-framework batteries for stationary energy storage", Nature Communications, vol. 5, Jan. 6, 2014 (Jan. 6, 2014) pp. 3007-1, XP055150480, United Kingdom ISSN: 2041-1723, DOI: 10.1038/ncomm54007.

International Search Report for International application No. PCT/US2016/040209 with transmission dated Oct. 31, 2016.

U.S. Appl. No. 14/755,607, filed Jun. 30, 2015, Shahrokh Motallebi et al.

U.S. Appl. No. 14/880,010, filed Oct. 9, 2015, Shahrokh Motallebi et al.

U.S. Appl. No. 15/859,160, filed Dec. 29, 2017, Shahrokh Motallebi et al.

* cited by examiner

SURFACE-MODIFIED CYANIDE-BASED TRANSITION METAL COMPOUNDS

CROSS REFERENCE TO RELATED APPLICATIONS

This Application is a Continuation of application Ser. No. 15/859,160, now U.S. Pat. No. 10,414,666, filed on Dec. 29, 2017; application Ser. No. 15/859,160 is a Continuation of Application PCT/US16/40209 filed on Jun. 29, 2016; Application PCT/US16/40209 is a Continuation of application Ser. No. 14/880,010, now U.S. Pat. No. 9,359,219, filed on Oct. 9, 2015; application Ser. No. 14/880,010 is a Division of application Ser. No. 14/755,607, now U.S. Pat. No. 9,299,981, filed on Jun. 30, 2015; Application PCT/US16/40209 is a Continuation of application Ser. No. 14/755,607, U.S. Pat. No. 9,299,981, filed on Jun. 30, 2015; the contents of which are all hereby expressly incorporated by reference thereto in their entireties for all purposes.

STATEMENT REGARDING FEDERALLY SPONSORED RESEARCH OR DEVELOPMENT

This invention was made with government support under ARPA-E Award No. DE-AR000300 With Alveo Energy, Inc., awarded by DOE. The government has certain rights in the invention.

FIELD OF THE INVENTION

The present invention relates generally to environmental stability of materials useful in electrochemical devices, and more specifically, but not exclusively, to compositions, articles of manufacture, and methods for manufacture of environmentally stabilized electrode active materials, for example stabilization of air sensitive anode active transition metal cyanide coordination compound (TMCCC) materials.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

There is a trend in electrochemical cell design that requires a development of new materials for energy storage technologies to allow for safe, economic and energy efficient batteries. A number of cyanide-based transition metal compounds used as cathodes have been developed for organic and aqueous electrolytes. Very little work to date has been published on cyanide-based transition metal compounds used as anodes, and more specifically, used as anode electrodes in aqueous electrolyte batteries.

Recent developments regarding cyanide-bridged coordination polymer electrodes for aqueous-based electrolyte batteries have revealed promising results. However, many challenges must be have addressed before cyanide-based transition metal compounds may be safely, economically and used in an energy efficiently manner in an anode, especially in an anode operated in an aqueous electrolyte cell. Relatively rapid fade rates of the electrode, as well as difficulties in processing and handling the material in the presence of oxygen are important technical, economic and safety concerns.

For example, manganese hexacyanomanganate anode material is air and moisture sensitive and thus its storage, handling, and processing require a controlled environment in which oxygen and moisture should be absent. Incorporating such a material into a product, like a battery, has an important impact on a cost of fabrication of the battery and renders the material less attractive as an anode active material despite its potential advantages due to its electrochemical properties.

What is needed is a system, method, and articles of manufacture for an improved transition metal cyanide coordination compound (TMCCC) composition, an improved electrode including the composition, and a manufacturing method for the composition.

BRIEF SUMMARY OF THE INVENTION

Disclosed are systems, methods, and articles of manufacture for an improved transition metal cyanide coordination compound (TMCCC) composition, an improved electrode including the composition, and a manufacturing method for the composition.

The following summary of the invention is provided to facilitate an understanding of some of the technical features related to air stabilization of air sensitive materials, and is not intended to be a full description of the present invention. A full appreciation of the various aspects of the invention can be gained by taking the entire specification, claims, drawings, and abstract as a whole. The present invention is applicable to other materials and processes.

Embodiments of the present invention may include a method of reacting an air sensitive material, such as a TMCCC material, that may be used in an electrode of an electrochemical device with one or more chelating agents. A consequence of such a method is that the resulting material demonstrates improved air stability without experiencing an appreciable degradation of the desirable electrochemical and cycle life performance metrics. These chelating agents may include an acid-containing material that interacts with metal ions on a surface of elements of the TMCCC material. The resulting material exhibits diminished reactivity and therefore increased stability within the ambient environment, particularly oxygen and water.

An embodiment of the present invention may include a final composition of matter having a general formula: $A_xM[R(CN)_{6-j}L_j]_z \cdot (Che)_w \cdot nH_2O$, where: A is a cation; M is a metal cation; R is a transition metal cation; L is a ligand that may be substituted in the place of a $CN^-$ ligand and Che is an acid-containing chelating agent.

An embodiment of the present invention may include an electrode in an electrochemical device, the electrode including a final composition of matter having a general formula: $A_xM[R(CN)_{6-j}L_j]_z \cdot (Che)_w \cdot nH_2O$, where: A is a cation; M is a metal cation; R is a transition metal cation; L is a ligand that may be substituted in the place of a $CN^-$ ligand and Che is an acid-containing chelating agent.

An embodiment of the present invention may include a method for manufacturing an environment-stabilized TMCCC material including producing a particulated TMCCC material and then washing the particulated TMCCC material with a solution including a material containing an acid group to produce a stabilized TMCCC material. This stabilized TMCCC material may be used in manufacturing structures useful in electrochemical devices, such as an anode for example, with greatly decreased concerns regarding degradation consequent to exposure to ambient atmosphere.

An embodiment of the present invention may include a composition of matter of the formula I: $A_x Mn_{(y-k)} M^j_k [Mn^m (CN)_{(6-p-q)}(NC)_p(Che\_I)^r_q]_z \cdot (Che\_I)^r_w (Vac)_{(1-z)} \cdot nH_2O$ (Formula I), including surface-modified cyanide-bridged coordination polymers having well faceted cubic crystal structures with crystal size of more than 1 micron and having diminished surface reactivity exhibit improved air stability.

A method for manufacturing an environment-stabilized TMCCC material, including a) synthesizing a particulated TMCCC material from a precursor salt, said precursor salt including a transition metal and a first chelation species (Che_I); and thereafter b) combining the particulated TMCCC material with a solution including a second chelation species (Che_II) to produce a stabilized TMCCC, said second chelation species including one or more chemical species selected from the group including a first material including said first chelation species, a second material excluding said first chelation species, and combinations thereof;

wherein said stabilized TMCCC material includes:

at least one composition represented by Formula II: $A_x Mn_{(y-k)} M^j_k [Mn^m(CN)_{(6-p-q)}(NC)_p(Che\_I)^r_q]_z$. CHE_GROUP $(Vac)_{(1-z)} \cdot nH_2O$, wherein CHE_GROUP includes one or more chelation materials selected from the group consisting of $(Che\_I)^r_w$, $(Che\_II)^s_v$, and combinations thereof (Formula II):

wherein, in Formula II, each A is an independently selected alkali metal Li, Na, or K; and each dopant M may optionally be at least one independently selected alkaline earth metal Mg or Ca, post-transition metal Al, Ga, In, Sn, or Pb, or transition metal Sc, Ti, V, Cr, Fe, Co, Ni, Cu, Zn, Pd, Ag, or Cd having an average valence j; and Che represents an acid chelating agent which includes ligand binding atoms that form one or more covalent linkages with Mn or with Mn and M; and wherein $0 < j \leq 4$, $0 \leq k \leq 0.1$, $0 \leq (p+q) \leq 6$, $0 < x \leq 4$, $0 < y \leq 1$, $0 < z \leq 1$, $0 < w \leq 0.2$; $-3 \leq r \leq 3$; $0 < v \leq 0.2$; $-3 \leq s \leq 3$; and $0 \leq n \leq 6$;

wherein $x+2(y-k)+jk+(m+(r+1)q-6)z+wr+vs=0$; and wherein Formula I includes one or more $Mn(CN)_{(6-p-q)}(NC)_p(Che\_I)^r_q$ complexes each including an Mn atom, and wherein p is an average number of NC groups found in said one or more $Mn(CN)_{(6-p-q)}(NC)_p(Che\_I)^r_q$ complexes; and wherein q is an average number of Che_I groups found in said one or more $Mn(CN)_{(6-p-q)}(NC)_p(Che\_I)^r_q$ complexes; and wherein m is an average valence of said Mn atoms found in said one or more $Mn(CN)_{(6-p-q)}(NC)_p(Che\_I)^r_q$ complexes;

wherein (Vac) identifies a $Mn(CN)_{(6-p-q)}(NC)_p(Che\_I)^r_q$ vacancy;

wherein CN identifies a cyano group; and wherein NC identifies an isocyano group.

An embodiment of the present invention may include two chelation species (Che_I and Che_II).—for example Che_I is present during a synthesis, so it can be more easily substituted into the hexacyano complexes in quantity q. Che_II, on the other hand, may only be present after the synthesis during a washing step. The specification evidences that Che_II may displace some Che_1 on the surface of the particles (quantity w of Che_I replaced by quantity v of Che_II). It is not believed that it is likely that Che_II could partially or fully displace Che_I in the complexes in quantity q.

An embodiment may include different related products represented by $A_x Mn_{(y-k)} M^j_k [Mn^m(CN)_{(6-p-q)}(NC)_p (Che\_I)^r_q]_z$. CHE_GROUP $(Vac)_{(1-z)} \cdot nH_2O$ wherein the Che_I species is the "in-structure" chelation species present during synthesis and the CHE_GROUP represents chelation species on surface and may include Che_I and/or Che_II.

An embodiment of the present invention may include a method, product, composition allowing for multiple chelation species in Formula_I, including: a) synthesis with Che_I; b) isolation to remove product from synthesis solution; c) washing the isolated product from b) with a solution containing no chelating agents (removes any excess Che_I) which produces a product 1 wherein CHE_GROUP includes only Che_I; d) washing this product 1 with a solution containing Che_II which results in CHE_GROUP at this stage including some or all of Che_II; and e) a final isolation (e.g., filtration) to remove excess Che_II solution, resulting in a product 2 different from product 1 in that CHE_GROUP has Che_II replacing some or all of Che_I on the surface. A variation of this may include a step f) after step a) to add Che_II to the synthesis solution and then followed by a step g) to isolate/wash with a solution containing no chelating agents (similar to step c) which results, broadly, in product 2 with some or all surface Che_I replaced by Che_II.

Embodiments of surface modified cyanide-bridged coordination polymers of the present invention exhibit very good air stability. In some embodiments, a surface oxidation of particles of these materials, upon exposure to air, was negligible even after 60 hours. Comparisons between exposed and unexposed materials to air shows that there is no difference between their electrochemical performances and that there is an order of magnitude improvement of their fade capacity loss compared to other cyanide-based transition metal compounds.

From safety and economic point of view, the ease of preparation and improved air stability of theses novel materials makes them very attractive candidate in the family of cyanide-bridged coordination polymer-based anodes for electrochemical devices, such as battery technology for example.

These materials can be used in electrodes for electrochemical energy storage devices such as batteries. These batteries can be used for applications including stationary storage, vehicles, and portable electronics. These materials can also be used as electrochromic electrodes in electrochromic devices.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 1a illustrates an SEM image of an oxalic acid surface-modified TMCCC material after exposure to air for 0 hours;

FIG. 1b illustrates an SEM image of an oxalic acid surface-modified TMCCC material after exposure to air for 2 hours;

FIG. 1c illustrates an SEM image of an oxalic acid surface-modified TMCCC material after exposure to air for 10 hours; and FIG. 1d illustrates an SEM image of an oxalic acid surface-modified TMCCC material after exposure to air for 60 hours;

FIG. 2a illustrates an SEM image of a surface-unmodified TMCCC material after exposure to air for 2 hours;

FIG. 2b illustrates an SEM image of a surface-modified TMCCC material (with citric acid) after exposure to air for 2 hours;

FIG. 2c illustrates an SEM image of a surface-modified TMCCC material (with malic acid) after exposure to air for 10 hours; and FIG. 2d illustrates an SEM image of a surface-modified TMCCC material (with sodium glycinate) after exposure to air for 10 hours.

DETAILED DESCRIPTION OF THE INVENTION

Figure 1A:
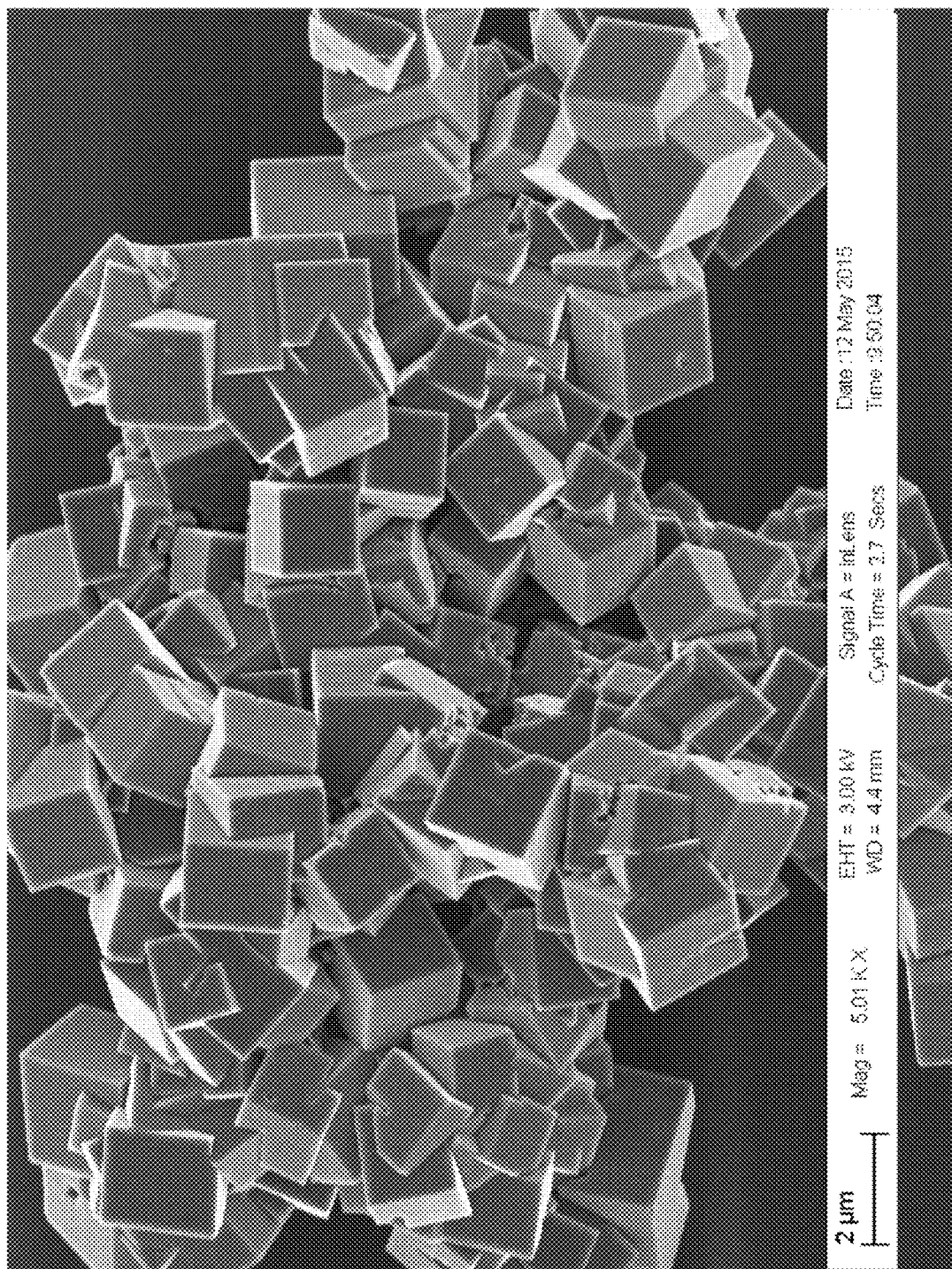
FIG. 1a-FIG. 1d illustrate a set of scanning electron microscopy (SEM) images of oxalic acid surface-modified materials at different exposure time to air.

Embodiments of the present invention provide systems, methods, and articles of manufacture for an improved transition metal cyanide coordination compound (TMCCC) composition, an improved electrode including the composition, and a manufacturing method for the composition. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

Figure 1B:
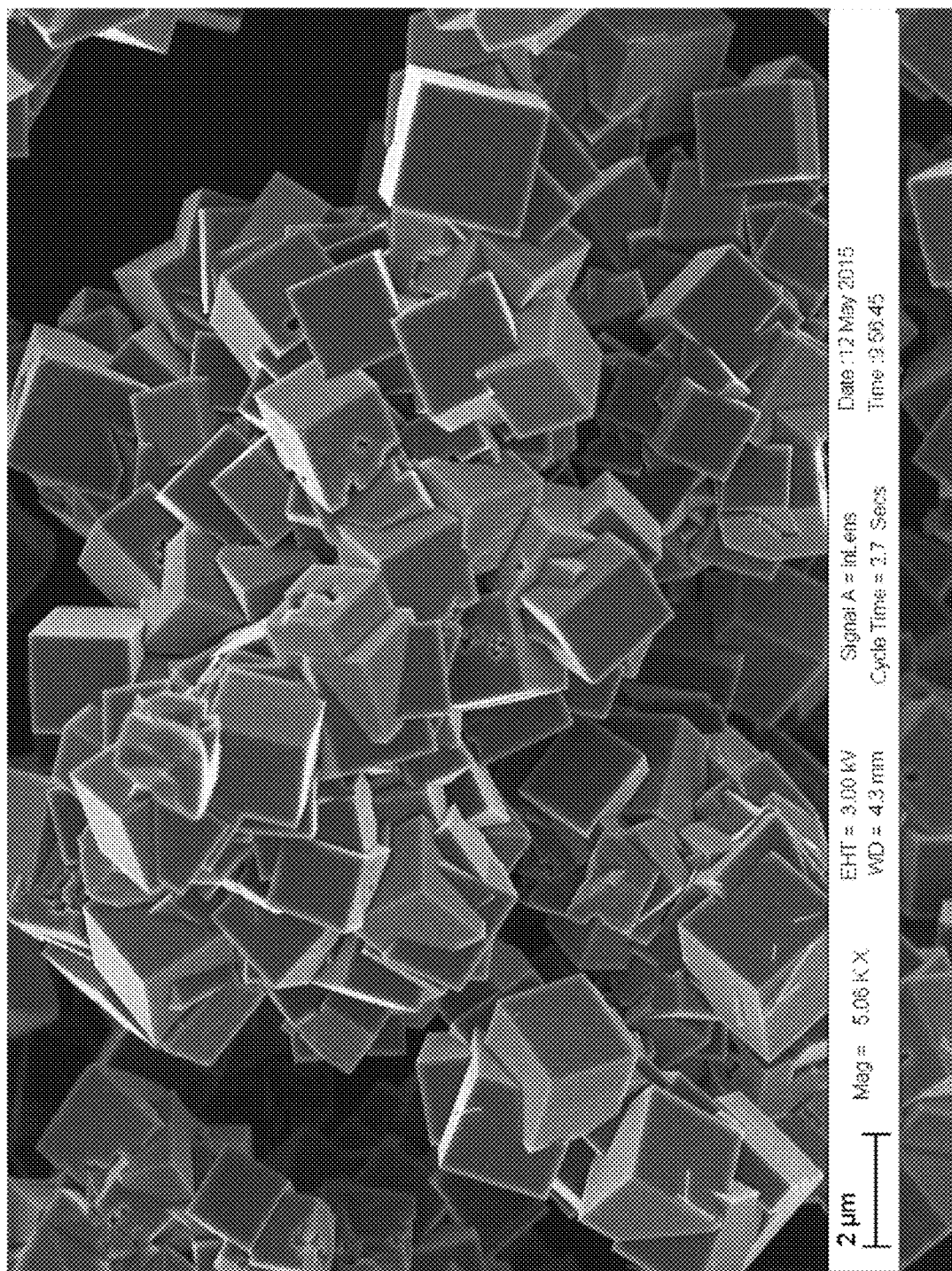
Figure 1C:
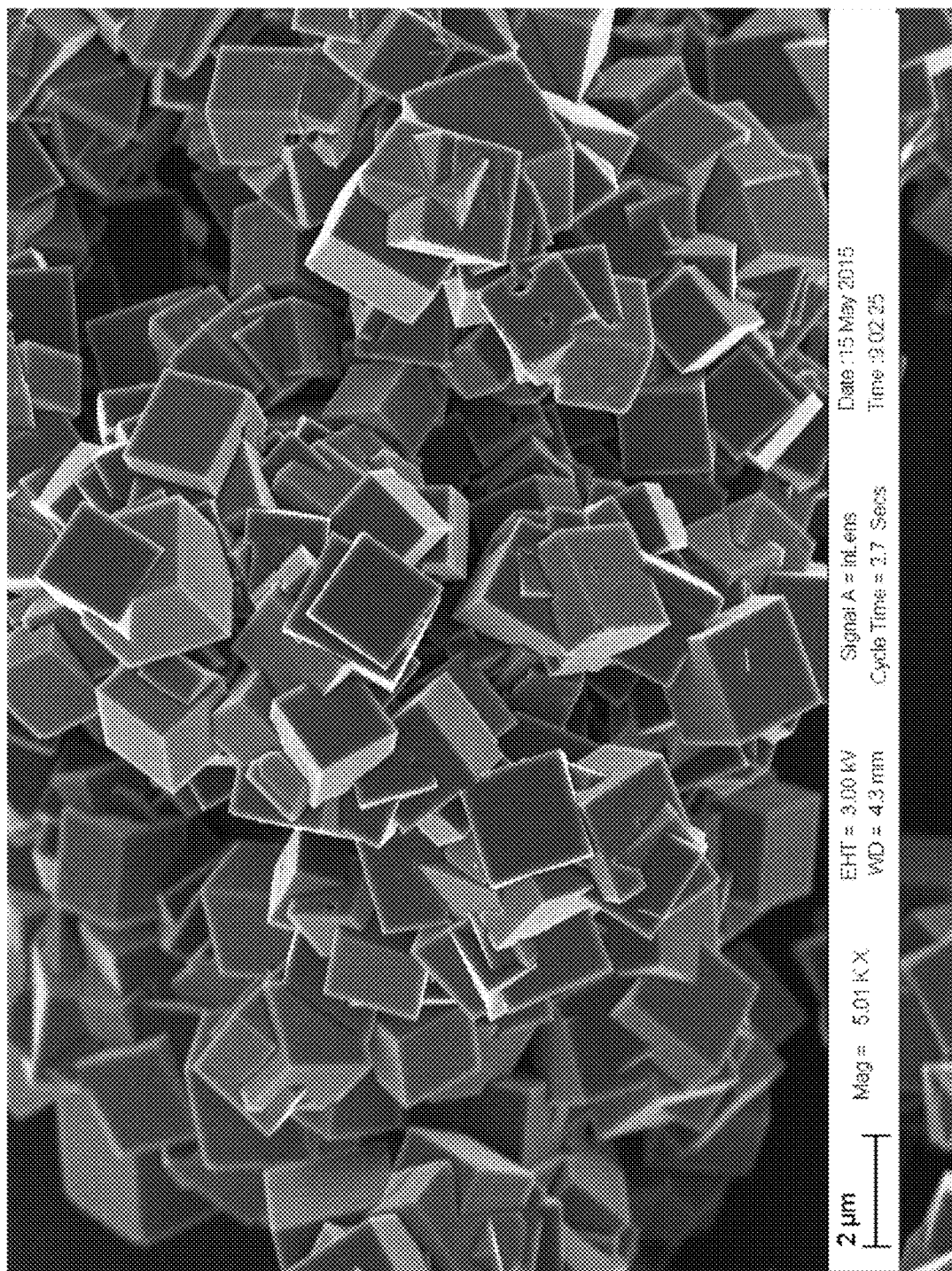
Figure 1D:
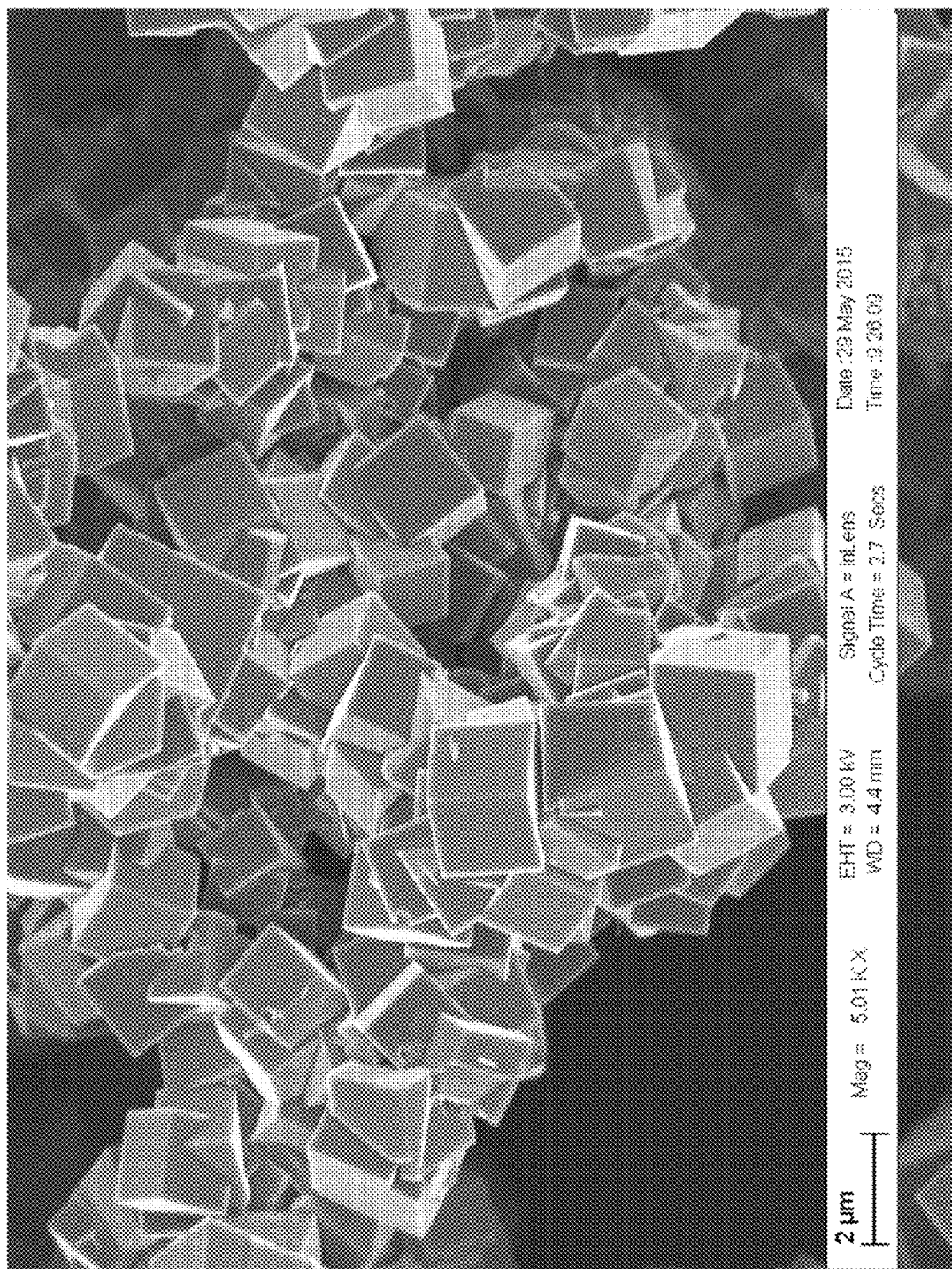

FIG. 1a-FIG. 1d illustrate a set of scanning electron microscopy (SEM) images of oxalic acid surface-modified materials at different exposure time to air; FIG. 1a illustrates an SEM image of an oxalic acid surface-modified TMCCC material after exposure to air for 0 hours; FIG. 1b illustrates an SEM image of an oxalic acid surface-modified TMCCC material after exposure to air for 2 hours; FIG. 1c illustrates an SEM image of an oxalic acid surface-modified TMCCC material after exposure to air for 10 hours; and FIG. 1d illustrates an SEM image of an oxalic acid surface-modified TMCCC material after exposure to air for 60 hours.

Figure 2A:
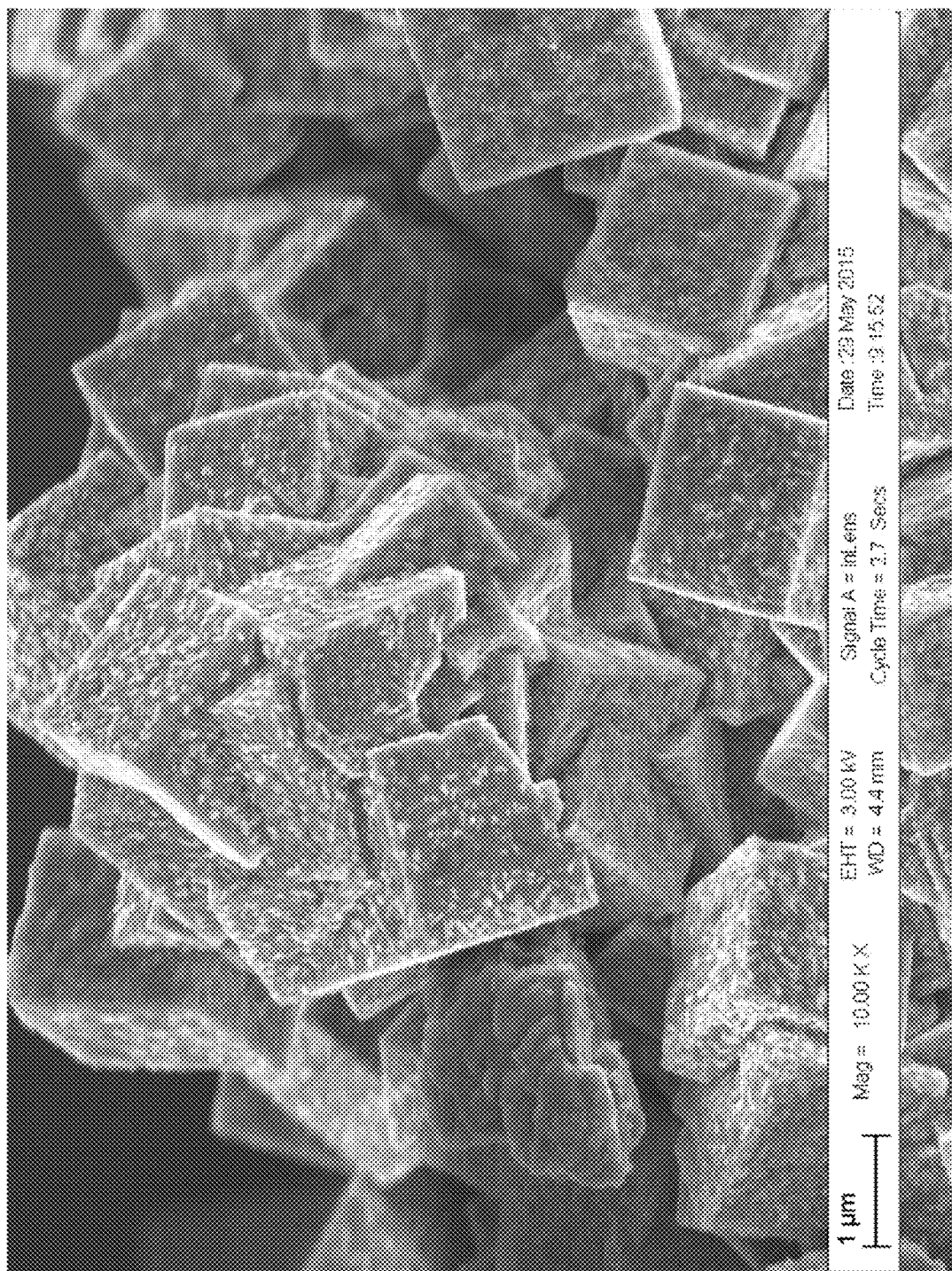
FIG. 2a—FIG. 2d illustrate a set of scanning electron microscopy (SEM) images of surface-modified versus surface-unmodified TMCCC materials exposed to air.
Figure 2B:
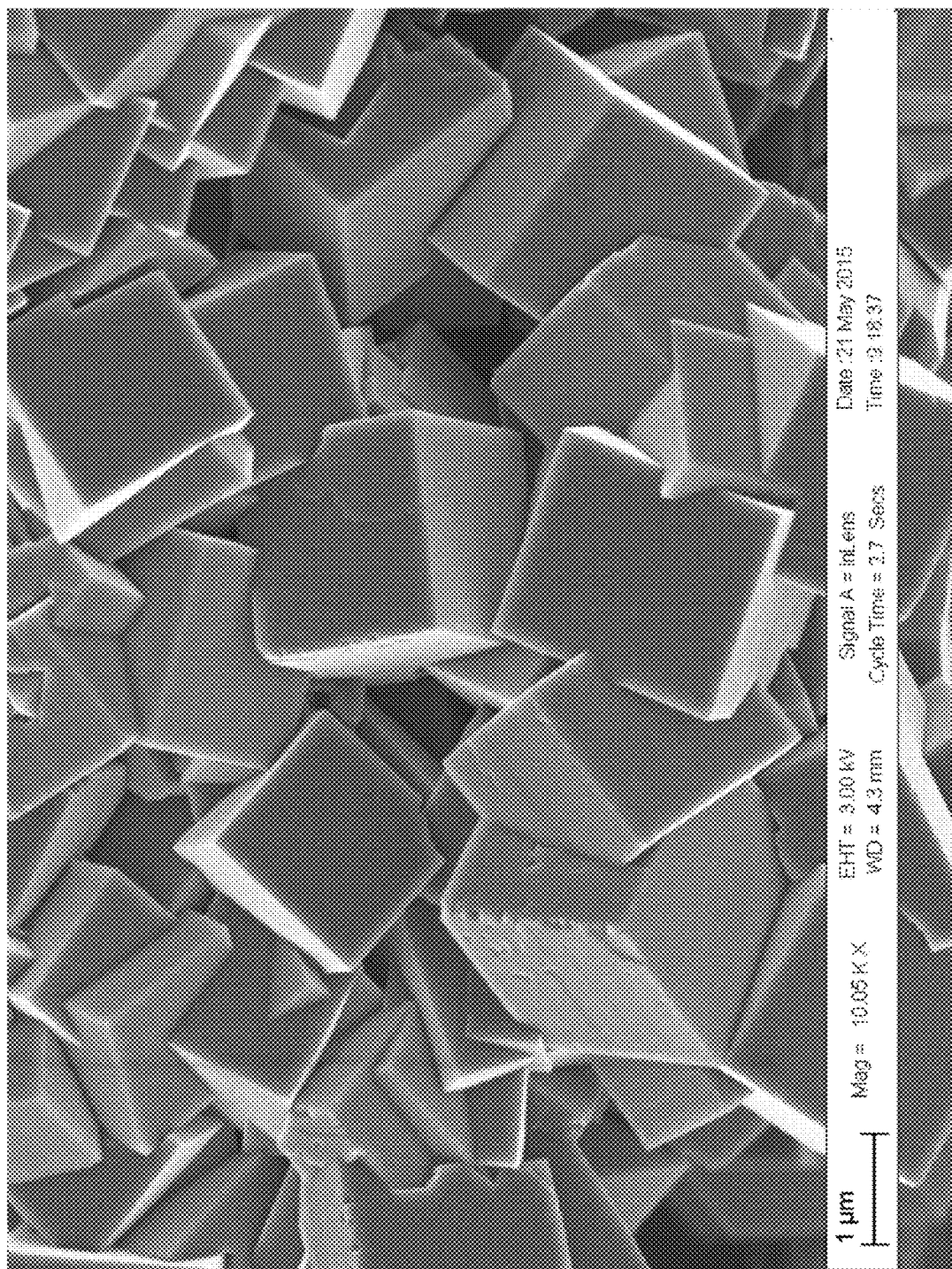
Figure 2C:
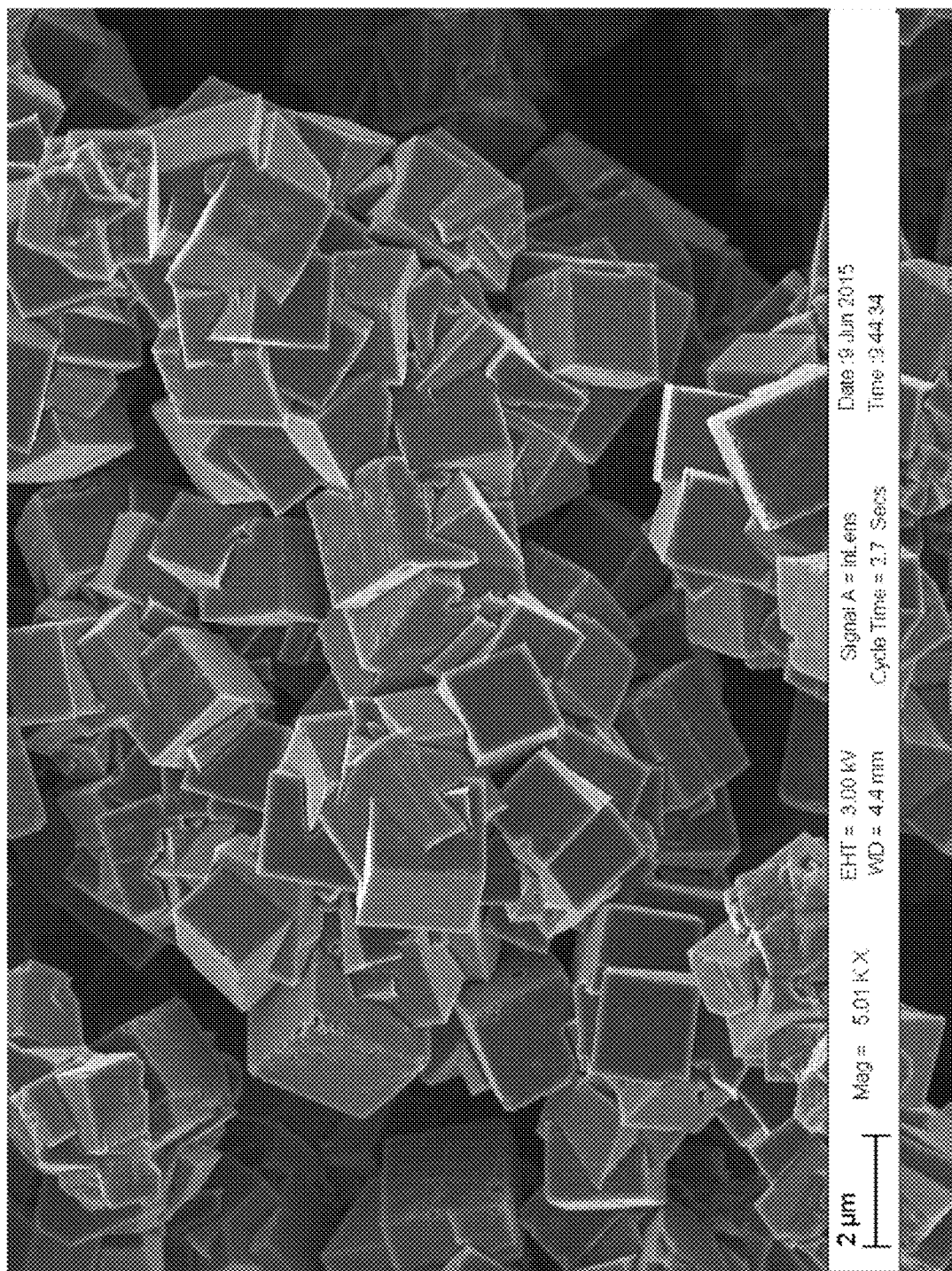
Figure 2D:
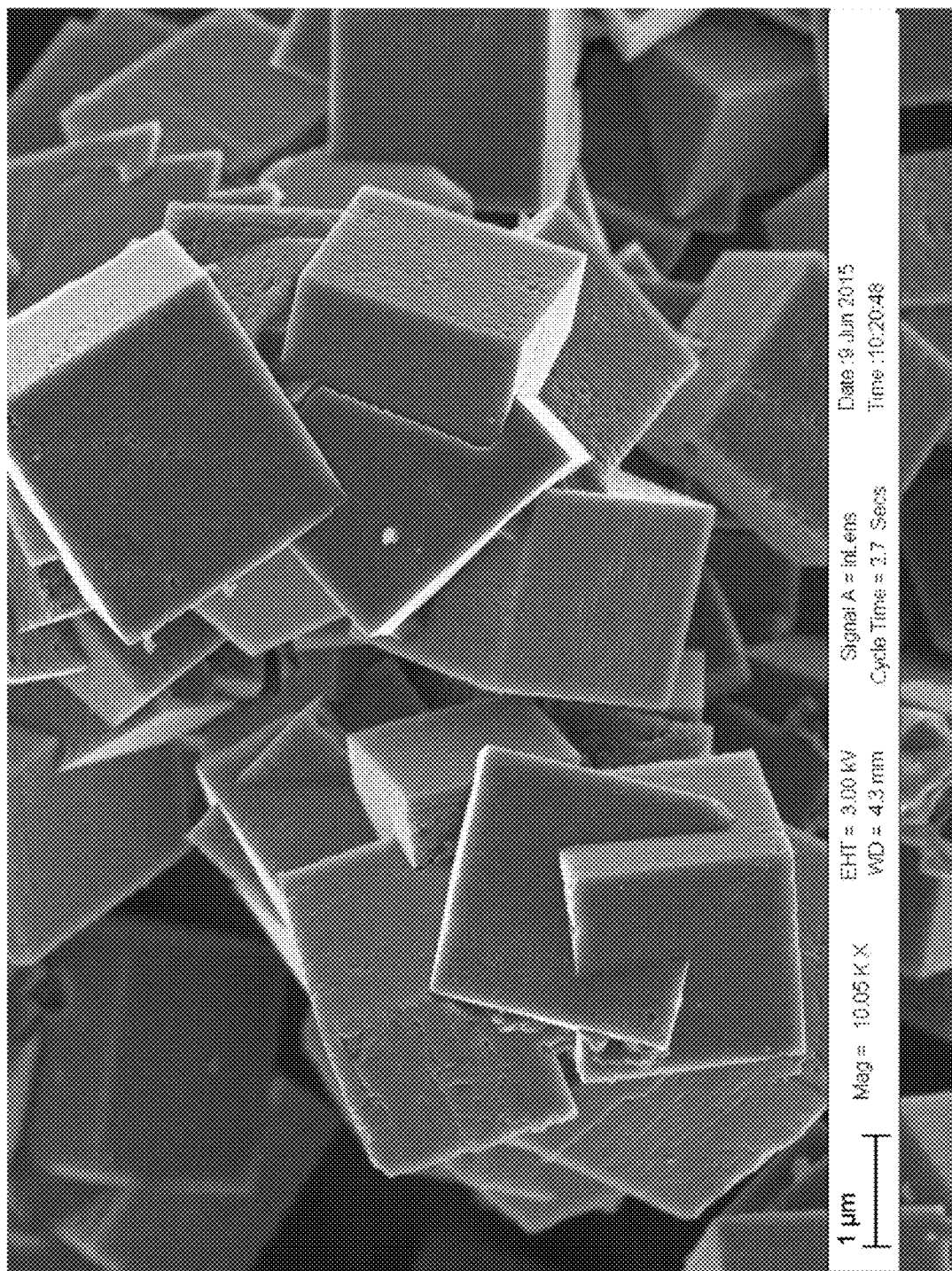

FIG. 2a-FIG. 2d illustrate a set of scanning electron microscopy (SEM) images of surface-modified versus surface-unmodified TMCCC materials exposed to air; FIG. 2a illustrates an SEM image of a surface-unmodified TMCCC material after exposure to air for 2 hours; FIG. 2b illustrates an SEM image of a surface-modified TMCCC material (with citric acid) after exposure to air for 2 hours; FIG. 2c illustrates an SEM image of a surface-modified TMCCC material (with malic acid) after exposure to air for 10 hours; and FIG. 2d illustrates an SEM image of a surface-modified TMCCC material (with sodium glycinate) after exposure to air for 10 hours.

Figure 3:
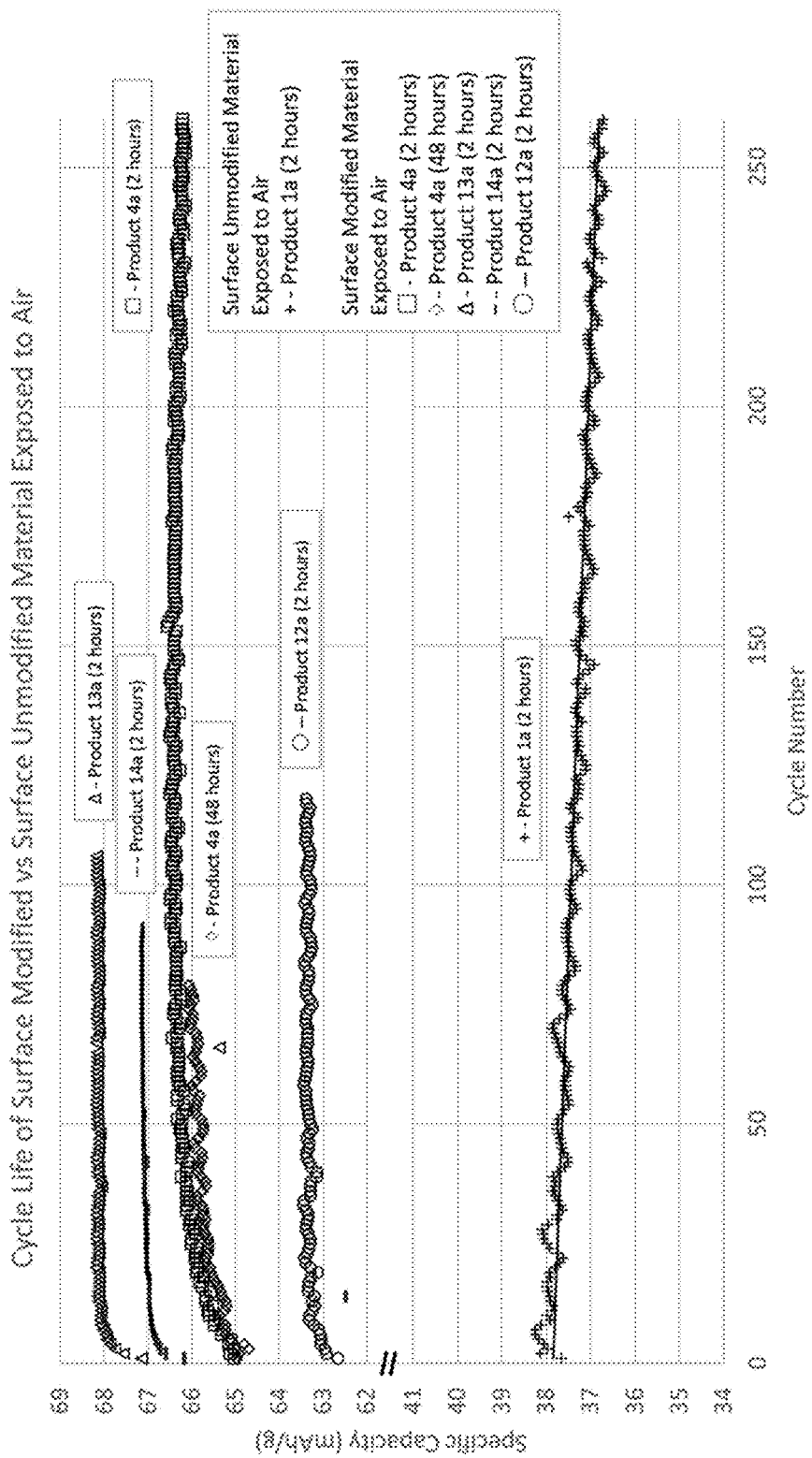
FIG. 3 illustrates a cycle life of electrodes made of surface-modified TMCCC materials and surface-unmodified TMCCC materials exposed to air.

FIG. 3 illustrates a cycle life of electrodes made of surface-modified TMCCC materials and surface-unmodified TMCCC materials exposed to air.

Figure 4:
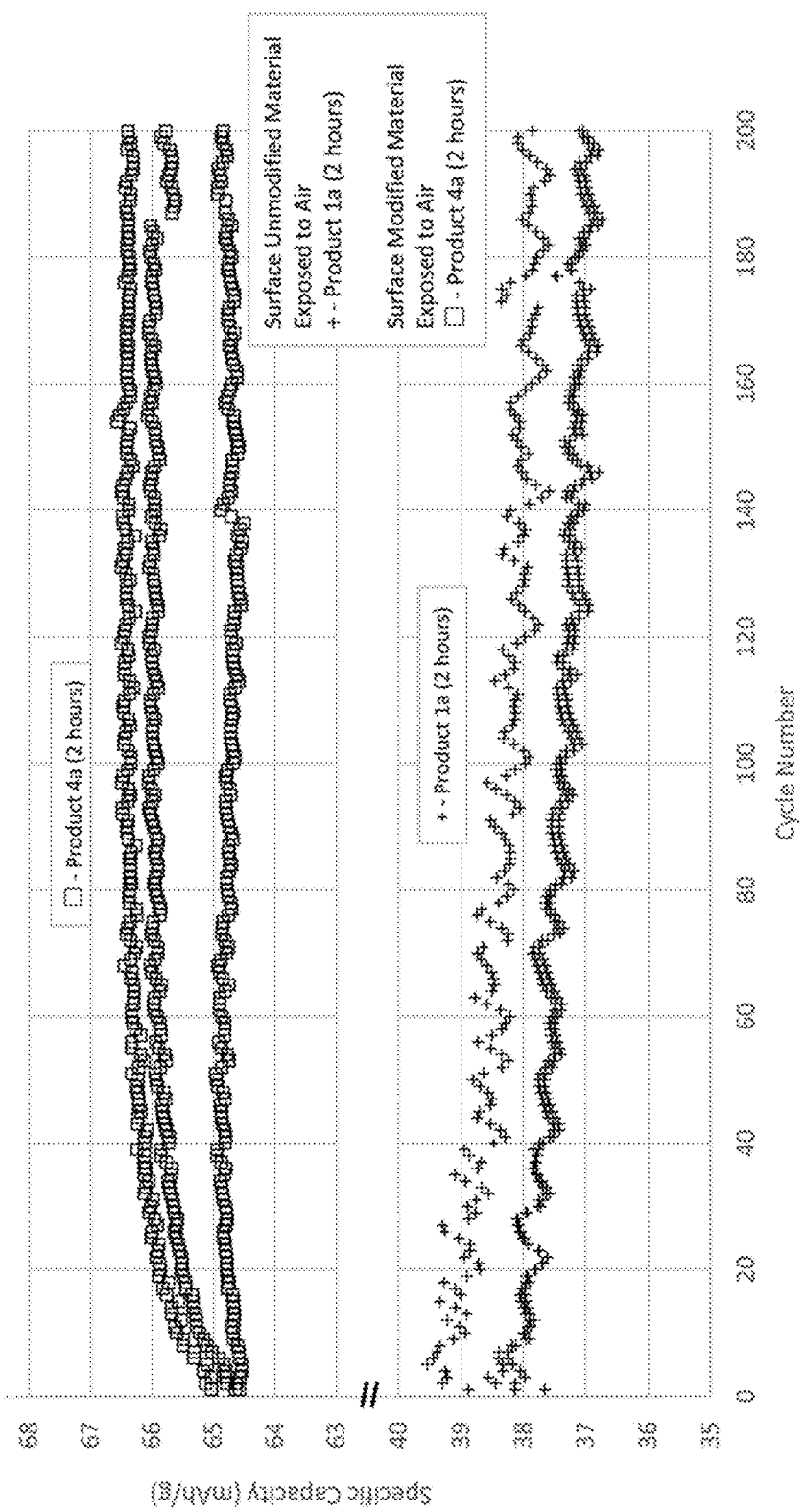
FIG. 4 illustrates a cycle life of oxalic acid surface-modified TMCCC materials and surface-unmodified TMCCC materials after 2 hours exposure to air.

FIG. 4 illustrates a cycle life of oxalic acid surface-modified TMCCC materials and surface-unmodified TMCCC materials after 2 hours exposure to air.

Some embodiments of the present invention may be intended to overcome ambient atmosphere stability problems and may include surface-modified cyanide-bridged coordination polymers anodes for use in batteries, and more specifically, to electrodes including anodes having improved air stability, fade rate and excellent energy efficiency.

It is known that cyanide-bridged coordination polymers are capable of storing ions exchanged in electrochemical processes for the storage and extraction of electrical energy. Ion insertion/extraction accompanied by oxidation-reduction of these coordination polymers make these materials good candidates as electrode compounds in rechargeable batteries.

The ion storage efficiency of the cyanide-bridged coordination polymers is related to its structure and, in theory, the Perovskite-type structure $A_2M^{II}[M^{II}(CN)_6]$ (where A is an alkali cation and M and M' are transition metals) is the structure which provides the highest electrode efficiency. However, it has been demonstrated that preparation of Perovskite-type structural framework is not a trivial process and this is specifically true for air sensitive alkali cation salts of Manganese (II) hexacayanomanganate compounds that may be included in embodiments of the present invention.

A cyanide-bridged coordination polymer embodiment of the present invention may be represented by the formula I:

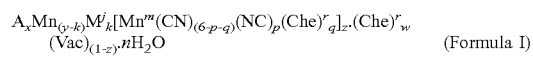

$$A_xMn_{(y-k)}M^j_k[Mn^m(CN)_{(6-p-q)}(NC)_p(Che)^r_q]_z \cdot (Che)^r_w (Vac)_{(1-z)} \cdot nH_2O \quad \text{(Formula I)}$$

wherein, in Formula I, each A is an independently selected alkali metal Li, Na, or K; and each dopant M may optionally be at least one independently selected alkaline earth metal Mg or Ca, post-transition metal Al, Ga, In, Sn, or Pb, or transition metal Sc, Ti, V, Cr, Fe, Co, Ni, Cu, Zn, Pd, Ag, or Cd having an average valence j; and Che represents an organic acid chelating agent which possesses ligand binding atoms that form one or more covalent linkages with Mn or with Mn and M, and wherein $0 \leq j \leq 4$, $0 \leq k \leq 0.1$, $0 \leq (p+q) < 6$, $0 < x \leq 4$, $0 < y \leq 1$, $0 < z \leq 1$, $0 < w \leq 0.2$ and $0 \leq n \leq 6$; $-3 \leq r \leq 3$; wherein $x+2(y-k)+jk+(m+(r+1)q-6)z+wr=0$; and wherein Formula I includes one or more $Mn(CN)_{(6-p-q)}(NC)_p(Che)^r_q$ complexes each including an Mn atom, and wherein p is an average number of NC groups found in said one or more $Mn(CN)_{(6-p-q)}(NC)_p(Che)^r_q$ complexes; and wherein q is an average number of Che groups found in said one or more $Mn(CN)_{(6-p-q)}(NC)_p(Che)^r_q$ complexes; and wherein m is an average valence of said Mn atoms found in said one or more $Mn(CN)_{(6-p-q)}(NC)_p(Che)^r_q$ complexes; and wherein (Vac) identifies a $Mn(CN)_{(6-p-q)}(NC)_p(Che)^r_q$ vacancy.

Some embodiments of the cyanide-bridged coordination polymers of the present invention may have a very well faceted cubic crystal structures with crystal size of more than 1 micron. A chemical treatment of these particles, by simple and straightforward ligand exchange procedures by which the metal ions on the surface of the particles are bound by a strong chelating agent, provide materials with diminished surface reactivity and thus improved air stability.

The enhanced air stability of the materials of some embodiments of the present invention and the possibility of handling and processing them in air rather than in a controlled inert atmosphere makes these materials very attractive as electrode components in rechargeable batteries.

Processes for preparing these products are described in examples 4-15 of the experimental section below. A preferred method of preparation corresponds to a molar ratio of sodium cyanide to manganese (II) salt of more than 3 to 1. A most preferred molar ratio of sodium cyanide to manganese (II) salt is ranged from 3.0 to 1.0 to 3.3 to 1.0. A preferred manganese (II) salt is manganese (II) acetate hydrates. Preferred solvents include ethanol, methanol, and water, and their mixtures. A most preferred solvent is water. A temperature at which the reaction is carried out is ranged from 5 degrees Celsius to 40 degrees Celsius. A preferred temperature range is between 5 to 20 degrees Celsius. A preferred addition sequence is an addition of sodium cyanide solution to manganese (II) salt solution. An addition rate is preferred to be between approximately 1 min to 1 hour. A preferred addition rate is fast addition between 1 min to 20 min. Sodium cyanide is used as solid or in solution in water from concentration between 1.0 to 45.0 wt/wt %. A preferred concentration of sodium cyanide solution is between 15 to 20 wt/wt % in water. A preferred concentration of manganese (II) acetate hydrate in water is between 5 to 30 wt/wt %. A more preferred manganese (II) acetate hydrate in water is between 15 to 20 wt/wt %.

A composition including an embodiment of the present invention may correspond to a composition used for preparation of an anode electrode. This composition corresponds to a slurry or ink applied on a current collector. A composition corresponds to a mixture of an embodiment of the present invention, a binder, an electrical conductive material, additives and a solvent. The binder may be one or more components selected from the group consisting of a vinylfluoride/hexafluoropropylene copolymer, polyvinylidenefluoride (PVDF), polyacrylonitrile, polymethylmethacrylate, polytetrafluoroethylene, a mixture thereof, and styrene butadiene rubber-based polymer. The electrical conductive material may be selected from a crystalline carbon, an amorphous carbon, or a mixture thereof. The conductive material may be selected from acetylene black, ketjen black, natural graphite, artificial graphite, carbon black, carbon fiber, carbon nanotubes and graphene.

A solvent may be selected from solvents such as N-methylpyrrolidinone, N,N-dimethyformamide, dimethyl acetamide and dimethylsufoxide. The preferred solvent is N-methylpyrrolidinone.

Electrodes Preparation:

Manganese (II) hexacyanomanganate (II) salt selected from one of the examples disclosed herein was thoroughly mixed with carbon black (Timcal super C65) by grinding in a mortar pestle. A resulting grey powder was then mixed with a solution of polyvinylidene fluoride (Kynar HSV900) in N-methyl-2-pyrolidinone to produce a slurry. A mass ratio of active material, carbon black and polyvinylidene fluoride was 80:10:10. A thin layer of the thus obtained slurry was coated on a carbon cloth current collector to provide an electrode (intended to be an anode electrode) that was dried under vacuum. The resulting anode electrode is used without further treatment in electrochemical cell setups including the following air stability tests.

Air Stability Tests:

The products 1a-15a of the experimental section below were exposed to air for 2.0 hr to 60.0 hr and the resulting exposed powders were used in electrodes preparation as described above. The electrochemical properties of these materials after exposure to air were compared to their corresponding unexposed materials.

Analysis by Scanning Electron Microscopy (SEM) provided some evidence about the extent of surface protection of the particles against oxidation and decomposition. (See FIG. 1a-FIG. 1d and FIG. 2a-FIG. 2d). FIG. 1a-FIG. 1d illustrate SEM images of oxalic acid surface-modified materials at different exposure time to air. These SEM images clearly show that these particles are pristine with no evidence of surface oxidation even after 60 hours exposure time to air.

FIG. 2a illustrates SEM images of surface-unmodified material exposed to air for 2.0 hours with clear evidence of surface oxidation of particles resulting in formation of white spots and roughening of the surface. In contrast, FIG. 2b-FIG. 2d illustrate surface modified particles resulting from citric acid, malic acid and sodium glycinate treatments, respectively, show no evidence of surface oxidation or decomposition after 2 hours (FIG. 2b) and 10 hours (FIG. 2c and FIG. 2d) of exposure to air.

FIG. 3 illustrates a cycle life of electrodes made of surface-modified and surface-unmodified materials exposed to air. Comparisons between surface-modified and surface-unmodified materials shows that all the surface-modified materials retain their capacity after more than 250 cycles whereas the surface-unmodified material shows a noticeable capacity loss after 250 cycles.

FIG. 4 illustrates a cycle life of oxalic acid surface-modified materials and surface-unmodified materials after 2 hours exposure to air. Comparisons between oxalic acid surface-modified and surface-unmodified materials shows that surface-modified materials retain their capacity after 200 cycles whereas the surface-unmodified material shows a noticeable capacity loss after 200 cycles.

Table I shows a significant oxidation and capacity loss of surface unmodified materials after 2.0 hours exposure to air.

TABLE I

Electrochemical Analysis of Surface-Unmodified Materials Exposed to Air for 2 Hours

| Product # | Initial Open Circuit Voltage (V vs. Ag/AgCl) | | Cycle 5 Specific Capacity (mAh/g) | |
| --- | --- | --- | --- | --- |
| | 0 Hours air Exposure | 2 Hours Air Exposure | 0 Hours air Exposure | 2 Hours Air Exposure |
| 1a. | −0.310 | −0.194 | 67.88 | 51.73 |
| 2a. | −0.319 | −0.157 | 64.52 | 31.09 |
| 3a. | −0.260 | −0.218 | 66.00 | 55.37 |

Table II shows a result of an electrochemical analysis of surface-modified materials after exposure to air and the evidence of protection of their surfaces against oxidation and remarkable retention of their specific capacities.

TABLE II

Electrochemical Analysis of Surface-Modified Materials After Exposure to Air

| Product # | Initial Open Circuit Voltage (V vs. Ag/AgCl) | | | Cycle 5 Specific Capacity (mA/g) | | |
| --- | --- | --- | --- | --- | --- | --- |
| | 0 Hours Air Exposure | 2 Hours Air Exposure | 10 Hours Air Exposure | 0 Hours Air Exposure | 2 Hours Air Exposure | 10 Hours Air Exposure |
| 4a. | −0.283 | −0.281 | | 62.51 | 64.82 | |
| 5a. | −0.352 | −0.257 | −0.230 | 64.91 | 67.34 | 63.12 |
| 6a. | −0.348 | −0.251 | −0.223 | 65.61 | 67.88 | 61.26 |
| 7a. | −0.327 | −0.253 | −0.198 | 62.21 | 62.20 | 59.70 |
| 8a. | −0.360 | −0.240 | −0.222 | 66.75 | 59.17 | 60.32 |
| 9a. | −0.328 | | −0.230 | 67.72 | | 63.96 |
| 10a | −0.310 | | −0.232 | 69.42 | | 63.51 |
| 11a. | −0.353 | −0.233 | | 66.77 | 61.80 | |
| 12a. | −0.285 | −0.223 | | 66.26 | 62.03 | |
| 13a. | −0.261 | −0.257 | −0.237 | 68.03 | 66.95 | 65.57 |
| 14a. | −0.292 | −0.287 | −0.239 | 71.67 | 66.05 | 65.03 |

Table III shows that oxalic acid surface modification of the particles resulted in remarkable inhibition of surface oxidation of the particles with significant retention of specific capacity.

TABLE III

Electrochemical Analysis of Oxalic Acid Surface-Modified Material After Exposure to Air

| Product 4a Time Exposure (mins) | Initial Open Circuit Voltage (V vs. Ag/AgCl) | Cycle 5 Specific Capacity (mA/g) |
|---|---|---|
| 120 | −0.281 | 64.82 |
| 1800 | −0.248 | 60.69 |
| 2880 | −0.241 | 63.89 |
| 3600 | −0.223 | 64.09 |

Figure 5:
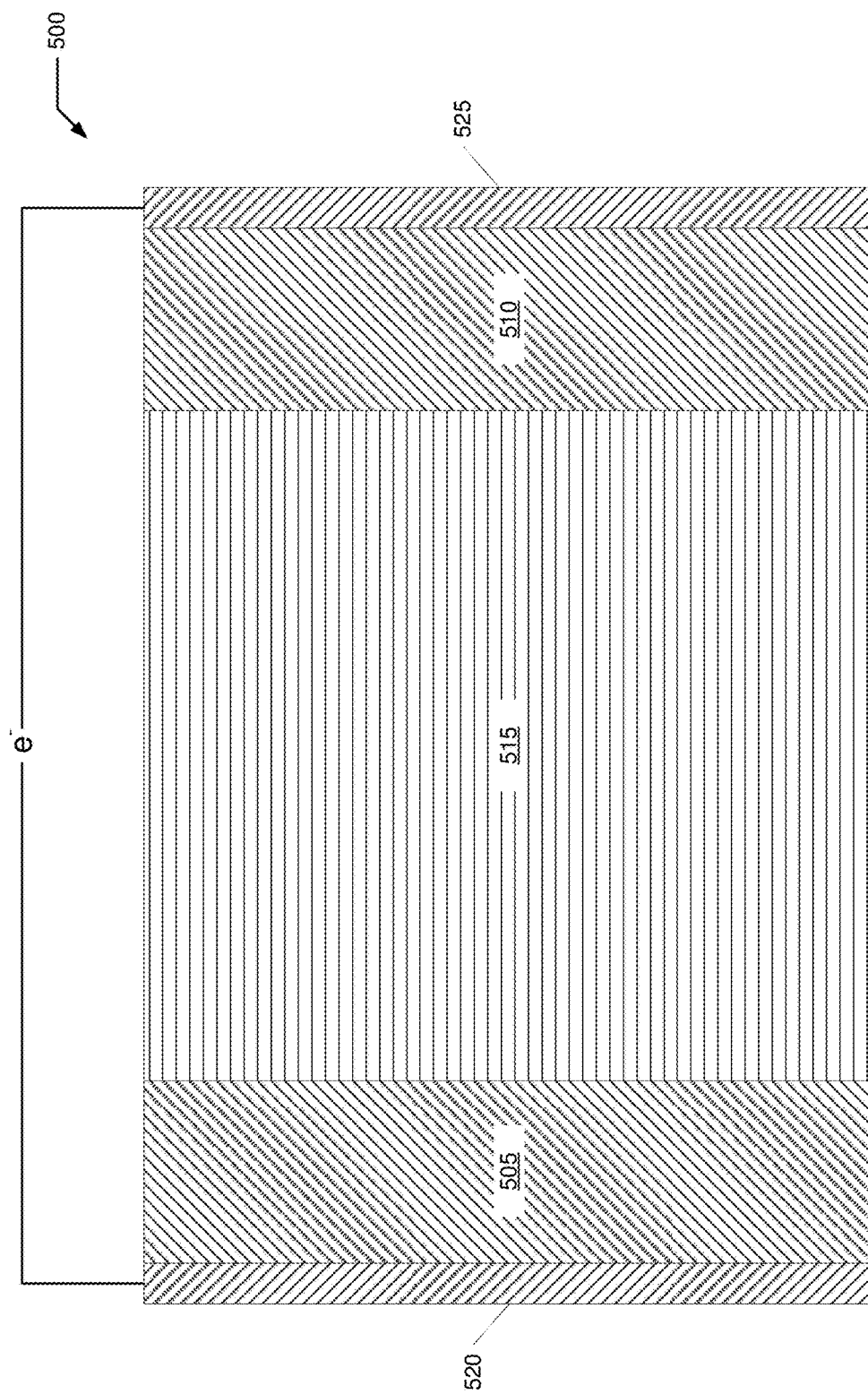
FIG. 5 illustrates a representative secondary electrochemical cell schematic having one or more surface-modified TMCCC electrodes disposed in contact with an electrolyte.

FIG. 5 illustrates a representative secondary electrochemical cell 500 schematic having one or more surface-modified TMCCC electrodes disposed in contact with an electrolyte as described herein. Cell 500 includes a negative electrode 505, a positive electrode 510 and an electrolyte 515 electrically communicated to the electrodes. One or both of negative electrode 505 and positive electrode 510 include TMCCC as an electrochemically active material. A negative current collector 520 including an electrically conductive material conducts electrons between negative electrode 505 and a first cell terminal (not shown). A positive current collector 525 including an electrically conductive material conducts electrons between positive electrode 510 and a second cell terminal (not shown). These current collectors permit cell 500 to provide electrical current to an external circuit or to receive electrical current/energy from an external circuit during recharging. In an actual implementation, all components of cell 500 are appropriately enclosed, such as within a protective housing with current collectors externally accessible. There are many different options for the format and arrangement of the components across a wide range of actual implementations, including aggregation of multiple cells into a battery among other uses and applications.

A method for manufacturing an environment-stabilized TMCCC material, including a) synthesizing a particulated TMCCC material from a precursor salt, said precursor salt including a transition metal and a first chelation species (Che_I); and thereafter b) combining the particulated TMCCC material with a solution including a second chelation species (Che_II) to produce a stabilized TMCCC, said second chelation species including one or more chemical species selected from the group including a first material including said first chelation species, a second material excluding said first chelation species, and combinations thereof;

wherein said stabilized TMCCC material includes:

at least one composition represented by Formula II: $A_x Mn_{(y-k)} M^j_k[Mn^m(CN)_{(6-p-q)}(NC)_p(Che\_I)^r_q]_z \cdot CHE\_GROUP(Vac)_{(1-z)} \cdot nH_2O$, wherein CHE_GROUP includes one or more chelation materials selected from the group consisting of $(Che\_I)^r_w$, $(Che\_II)^s_v$, and combinations thereof (Formula II):

wherein, in Formula II, each A is an independently selected alkali metal Li, Na, or K; and each dopant M may optionally be at least one independently selected alkaline earth metal Mg or Ca, post-transition metal Al, Ga, In, Sn, or Pb, or transition metal Sc, Ti, V, Cr, Fe, Co, Ni, Cu, Zn, Pd, Ag, or Cd having an average valence j; and Che represents an acid chelating agent which includes ligand binding atoms that form one or more covalent linkages with Mn or with Mn and M; and wherein $0<j\leq4$, $0\leq k\leq0.1$, $0\leq(p+q)\leq6$, $0<x\leq4$, $0<y\leq1$, $0<z\leq1$, $0<w\leq0.2$; $-3\leq r\leq3$; $0<v\leq0.2$; $-3\leq s\leq3$; and $0\leq n\leq6$;

wherein $x+2(y-k)+jk+(m+(r+1)q-6)z+wr+vs=0$; and wherein Formula II includes one or more $Mn(CN)_{(6-p-q)}(NC)_p(Che\_I)^r_q$ complexes each including an Mn atom, and wherein p is an average number of NC groups found in said one or more $Mn(CN)_{(6-p-q)}(NC)_p(Che\_I)^r_q$ complexes; and wherein q is an average number of Che_I groups found in said one or more $Mn(CN)_{(6-p-q)}(NC)_p(Che\_I)^r_q$ complexes; and wherein m is an average valence of said Mn atoms found in said one or more $Mn(CN)_{(6-p-q)}(NC)_p(Che\_I)^r_q$ complexes;

wherein (Vac) identifies a $Mn(CN)_{(6-p-q)}(NC)_p(Che\_I)^r_q$ vacancy;

wherein CN identifies a cyano group; and wherein NC identifies an isocyano group.

An embodiment of the present invention may include two chelation species (Che_I and Che_II).—for example Che_I is present during a synthesis, so it can be more easily substituted into the hexacyano complexes in quantity q. Che_II, on the other hand, may only be present after the synthesis during a washing step. The specification evidences that Che_II may displace some Che_1 on the surface of the particles (quantity w of Che_I replaced by quantity v of Che_II). It is not believed that it is likely that Che_II could partially or fully displace Che_I in the complexes in quantity q.

An embodiment may include different related products represented by $A_x Mn_{(y-k)} M^j_k[Mn^m(CN)_{(6-p-q)}(NC)_p(Che\_I)^r_q]_z \cdot CHE\_GROUP(Vac)_{(1-z)} \cdot nH_2O$ wherein the Che_I species is the "in-structure" chelation species present during synthesis and the CHE_GROUP represents one or more chelation species on a surface and may include Che_I and/or Che_II.

An embodiment of the present invention may include a method, product, composition allowing for multiple chelation species in Formula_II, including: a) synthesis with Che_I; b) isolation to remove product from synthesis solution; c) washing the isolated product from b) with a solution containing no chelating agents (removes any excess Che_I) which produces a product 1 wherein CHE_GROUP includes only Che_I; d) washing this product 1 with a solution containing Che_II which results in CHE_GROUP at this stage including some or all of Che_II; and e) a final isolation (e.g., filtration) to remove excess Che_II solution, resulting in a product 2 different from product 1 in that CHE_GROUP has Che_II replacing some or all of Che_I on the surface. A variation of this may include a step f) after step a) to add Che_II to the synthesis solution and then followed by a step g) to isolate/wash with a solution containing no chelating agents (similar to step c) which results, broadly, in product 2 with some or all surface Che_I replaced by Che_II. In this regard, formula II is a generalized representation of formula I that allows for introduction of a second different chelation species into the formation process after synthesis using a first chelation species. Without post-synthesis introduction of Che_II, formula II identifies the same resulting product as formula I.

EXPERIMENTAL SECTION

Example 1: (Product 1a)

To a stirred solution of manganese chloride tetrahydrate (23.75 g, 120.0 mmoles) in deaerated water (120 g), a solution of sodium cyanide (19.2 g, 392.0 mmoles) in deaerated water (90 g) was rapidly added over 1.0 min. under inert atmosphere of nitrogen (oxygen <0.1 ppm). The resulting mixture was stirred for an additional hour and then filtered over a 0.45 micron filter. The resulting blue powder was washed with deaerated water (50 ml), rinsed with deaerated methanol (200 ml) and dried under vacuum to give 19.7 g of a blue powder.

Example 2: (Product 2a)

To a stirred solution of manganese sulfate monohydrate (20.28 g, 120.0 mmoles) in deaerated water (120 g), a solution of sodium cyanide (19.2 g, 392.0 mmoles) in deaerated water (100 g) was rapidly added over 1.0 min. under inert atmosphere of nitrogen (oxygen <0.1 ppm). The resulting mixture was stirred for an additional hour and then filtered over a 0.45 micron filter. The resulting blue powder was washed with deaerated water (50 ml), rinsed with deaerated methanol (200 ml) and dried under vacuum to give 20.0 g of a blue powder.

Example 3: (Product 3a)

To a stirred solution of manganese acetate tetrahydrate (29.4 g, 120.0 mmoles) in deaerated water (120 g), a solution of sodium cyanide (19.2 g, 392.0 mmoles) in deaerated water (100 g) was rapidly added over 1.0 min. under inert atmosphere of nitrogen (oxygen <0.1 ppm). The resulting mixture was stirred for an additional hour and then filtered over a 0.45 micron filter. The resulting blue powder was washed with deaerated methanol (250 ml) and dried under vacuum to give 20.0 g of a blue powder.

Example 4—Surface Functionalization of Particles: (Product 4a)

To a stirred solution of manganese acetate tetrahydrate (29.4 g, 120.0 mmoles) in deaerated water (120 g), a solution of sodium cyanide (19.2 g, 392.0 mmoles) in deaerated water (100 g) was rapidly added over 1.0 min. under inert atmosphere of nitrogen (oxygen <0.1 ppm). The resulting mixture was stirred for an additional hour and then filtered over a 0.45 micron filter. The resulting blue powder was washed with deaerated methanol (50 ml) then with a solution of oxalic acid in deaerated methanol (20 wt/wt %, 100 ml) followed by deaerated methanol (150 ml). The resulting powder was dried under vacuum to give 20.0 g of a grey-blue powder.

Example 5—Surface Functionalization of Particles: (Product 5a)

To a stirred solution of manganese acetate tetrahydrate (14.7 g, 60.0 mmoles) in deaerated water (60 g), a solution of sodium cyanide (9.6 g, 196.0 mmoles) in deaerated water (50 g) was rapidly added over 1.0 min. under inert atmosphere of nitrogen (oxygen <0.1 ppm). The resulting mixture was stirred for an additional hour and then filtered over a 0.45 micron filter. The resulting blue powder was washed with deaerated methanol (50 ml) then with a solution of citric acid in deaerated methanol (2.5 wt/wt %, 100 ml) followed by deaerated methanol (150 ml). The resulting powder was dried under vacuum to give 9.8 g of a grey-blue powder.

Example 6—Surface Functionalization of Particles: (Product 6a)

To a stirred solution of manganese acetate tetrahydrate (14.7 g, 60.0 mmoles) in deaerated water (60 g), a solution of sodium cyanide (9.6 g, 196.0 mmoles) in deaerated water (50 g) was rapidly added over 1.0 min. under inert atmosphere of nitrogen (oxygen <0.1 ppm). The resulting mixture was stirred for an additional hour and then filtered over a 0.45 micron filter. The resulting blue powder was washed with deaerated methanol (50 ml) then with a solution of tartaric acid in deaerated methanol (2.5 wt/wt %, 100 ml) followed by deaerated methanol (150 ml). The resulting powder was dried under vacuum to give 9.9 g of a grey-blue powder.

Example 7—Surface Functionalization of Particles: (Product 7a)

To a stirred solution of manganese acetate tetrahydrate (14.7 g, 60.0 mmoles) in deaerated water (60 g), a solution of sodium cyanide (9.6 g, 196.0 mmoles) in deaerated water (50 g) was rapidly added over 1.0 min. under inert atmosphere of nitrogen (oxygen <0.1 ppm). The resulting mixture was stirred for an additional hour and then filtered over a 0.45 micron filter. The resulting blue powder was washed with deaerated methanol (50 ml) then with a solution of glycolic acid in deaerated methanol (2.5 wt/wt %, 100 ml) followed by deaerated methanol (150 ml). The resulting powder was dried under vacuum to give 9.8 g of a grey-blue powder.

Example 8—Surface Functionalization of Particles: (Product 8a)

To a stirred solution of manganese acetate tetrahydrate (14.7 g, 60.0 mmoles) in deaerated water (60 g), a solution of sodium cyanide (9.6 g, 196.0 mmoles) in deaerated water (50 g) was rapidly added over 1.0 min. under inert atmosphere of nitrogen (oxygen <0.1 ppm). The resulting mixture was stirred for an additional hour and then filtered over a 0.45 micron filter. The resulting blue powder was washed with deaerated methanol (50 ml) then with a solution of succinic acid in deaerated methanol (2.5 wt/wt %, 100 ml) followed by deaerated methanol (150 ml). The resulting powder was dried under vacuum to give 10.0 g of a grey-blue powder.

Example 9—Surface Functionalization of Particles: (Product 9a)

To a stirred solution of manganese acetate tetrahydrate (14.7 g, 60.0 mmoles) in deaerated water (60 g), a solution of sodium cyanide (9.6 g, 196.0 mmoles) in deaerated water (50 g) was rapidly added over 1.0 min. under inert atmosphere of nitrogen (oxygen <0.1 ppm). The resulting mixture was stirred for an additional hour and then filtered over a 0.45 micron filter. The resulting blue powder was washed with deaerated methanol (50 ml) then with a solution of malic acid in deaerated methanol (2.5 wt/wt %, 100 ml) followed by deaerated methanol (150 ml). The resulting powder was dried under vacuum to give 9.8 g of a grey-blue powder.

Example 10—Surface Functionalization of Particles: (Product 10a)

To a stirred solution of manganese acetate tetrahydrate (14.7 g, 60.0 mmoles) in deaerated water (60 g), a solution of sodium cyanide (9.6 g, 196.0 mmoles) in deaerated water (50 g) was rapidly added over 1.0 min. under inert atmosphere of nitrogen (oxygen <0.1 ppm). The resulting mixture was stirred for an additional hour and then filtered over a 0.45 micron filter. The resulting blue powder was washed with deaerated methanol (50 ml) then with a solution of lactic acid (88%) in deaerated methanol (2.5 wt/wt %, 100 ml) followed by deaerated methanol (150 ml). The resulting powder was dried under vacuum to give 9.7 g of a grey-blue powder.

Example 11—Surface Functionalization of Particles: (Product 11a)

To a stirred solution of manganese acetate tetrahydrate (29.4 g, 120.0 mmoles) in deaerated water (120 g), a solution of sodium cyanide (19.2 g, 392.0 mmoles) in deaerated water (100 g) was rapidly added over 1.0 min. under inert atmosphere of nitrogen (oxygen <0.1 ppm). The resulting mixture was stirred for an additional hour and then filtered over a 0.45 micron filter. The resulting blue powder was washed with a solution of acetic acid in deaerated methanol (30 V/V %, 50 ml) followed by deaerated methanol (150 ml). The resulting powder was dried under vacuum to give 20.0 g of a blue powder.

Example 12—Surface Functionalization of Particles: (Product 12a)

To a stirred solution of manganese acetate tetrahydrate (29.4 g, 120.0 mmoles) in deaerated water (120 g), a solution of sodium cyanide (19.2 g, 392.0 mmoles) in deaerated water (100 g) was rapidly added over 1.0 min. under inert atmosphere of nitrogen (oxygen <0.1 ppm). The resulting mixture was stirred for an additional hour and then filtered over a 0.45 micron filter. The resulting blue powder was washed with deaerated methanol (50 ml) then with a solution of HEDP (hydroxyethane dimethylene phosphonic acid) in deaerated methanol (5.0 wt/wt %, 50 ml) followed by deaerated methanol (150 ml). The resulting powder was dried under vacuum to give 20.0 g of a blue powder.

Example 13—Surface Functionalization of Particles: (Product 13a)

To a stirred solution of manganese acetate tetrahydrate (14.7 g, 60.0 mmoles) in deaerated water (60 g), a solution of sodium cyanide (9.6 g, 196.0 mmoles) in deaerated water (50 g) was rapidly added over 1.0 min. under inert atmosphere of nitrogen (oxygen <0.1 ppm). The resulting mixture was stirred for an hour and then sodium glycinate (1.0 g) was added in powder and the mixture was stirred for an additional 10 min. The mixture was then filtered over a 0.45 micron filter. The resulting blue powder was washed with deaerated methanol (150 ml) and then dried under vacuum to give 9.8 g of a grey-blue powder.

Example 14—Surface Functionalization of Particles: (Product 14a)

To a stirred solution of manganese acetate tetrahydrate (29.4 g, 120.0 mmoles) in deaerated water (120 g), a solution of sodium cyanide (19.2 g, 392.0 mmoles) in deaerated water (100 g) was rapidly added over 1.0 min. under inert atmosphere of nitrogen (oxygen <0.1 ppm). The resulting mixture was stirred for an additional hour and then EDTA (ethylene diamine tetra-acetic acid) tetrasodium salt (2.0 g) was added in powder and the mixture was stirred for an additional 10 min. The mixture was then filtered over a 0.45 micron filter. The resulting blue powder was washed with deaerated methanol (250 ml) and then dried under vacuum to give 20.0 g of a blue powder.

Example 15—Surface Functionalization of Particles: (Product 15a)

To a stirred solution of manganese acetate tetrahydrate (14.7 g, 60.0 mmoles) in deaerated water (60 g), a solution of sodium cyanide (9.6 g, 196.0 mmoles) in deaerated water (50 g) was rapidly added over 1.0 min. under inert atmosphere of nitrogen (oxygen <0.1 ppm). The resulting mixture was stirred for an hour and then sodium oxalate (4.0 g) was added in powder and the mixture was stirred for an additional 10 min. The mixture was then filtered over a 0.45 micron filter. The resulting blue powder was washed with deaerated methanol (150 ml) and then dried under vacuum to give 10.0 g of a grey-blue powder.

The systems, methods, compositions, materials, and articles of manufacture above have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A material, comprising:
   at least one composition represented by Formula II: 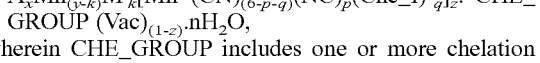·CHE_GROUP (Vac)$_{(1-z)}$·nH$_2$O,
   wherein CHE_GROUP includes one or more chelation materials selected from the group consisting of (Che_I)$^r_w$, (Che_II)$^s_v$, wherein Che_I includes a first chelation species and Che_II includes a second chelation species, said second chelation species including one or more chemical species selected from the group including a first material including said first chelation species, a second material excluding said first chelation species, and combinations thereof;
   wherein, in Formula II, each A is an independently selected alkali metal Li, Na, or K; and each dopant M may optionally be at least one independently selected alkaline earth metal Mg or Ca, post-transition metal Al, Ga, In, Sn, or Pb, or transition metal Sc, Ti, V, Cr, Fe, Co, Ni, Cu, Zn, Pd, Ag, or Cd having an average valence j; and Che represents an acid chelating agent which includes ligand binding atoms that form one or more covalent linkages with Mn or with Mn and M; and
   wherein 0<j≤4, 0≤k≤0.1, 0≤(p+q)≤6, 0<x≤4, 0<y≤1, 0<z≤1, 0<w≤0.2; −3≤r≤3; 0<v≤0.2; −3≤s≤3; and 0≤n≤6;
   wherein x+2(y−k)+jk+(m+(r+1)q−6)z+wr+vs=0; and
   wherein Formula II includes one or more Mn(CN)$_{(6-p-q)}$(NC)$_p$(Che_I)$^r_q$ complexes each including an Mn atom, and wherein p is an average number of NC groups found in said one or more Mn(CN)$_{(6-p-q)}$(NC)$_p$(Che_I)$^r_q$ complexes; and wherein q is an average number of Che_I groups found in said one or more Mn(CN)$_{(6-p-q)}$(NC)$_p$(Che_I)$^r_q$ complexes; and
   wherein m is an average valence of said Mn atoms found in said one or more Mn(CN)$_{(6-p-q)}$(NC)$_p$(Che_I)$^r_q$ complexes;
   wherein (Vac) identifies a Mn(CN)$_{(6-p-q)}$(NC)$_p$(Che_I)$^r_q$ vacancy;
   wherein CN identifies a cyano group; and
   wherein NC identifies an isocyano group.

2. The material of claim 1 wherein at least one of said chelation species comprises an organic acid.

3. The material of claim 2 wherein said organic acid comprises a compound containing a carboxylate group.

4. The material of claim 3 wherein said compound comprises one or more of acetic acid, formic acid, oxalic acid, gluconic acid, succinic acid, lactic acid, citric acid, sodium glycinate, or sodium oxalate.

5. The material of claim 1 wherein said organic acid comprises a compound containing an acid of an amine.

6. The material of claim 5 wherein said compound comprises EDTA.

7. The material of claim 1 wherein said organic acid comprises a compound containing a phosphonic acid group.

8. The material of claim 7 wherein said compound comprises HEDP.

* * * * *